United States Patent
Mogul

(10) Patent No.: US 7,756,690 B1
(45) Date of Patent: Jul. 13, 2010

(54) SYSTEM AND METHOD FOR SUPPORTING PERFORMANCE PREDICTION OF A SYSTEM HAVING AT LEAST ONE EXTERNAL INTERACTOR

(75) Inventor: Jeffrey Clifford Mogul, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

(21) Appl. No.: 11/829,654

(22) Filed: Jul. 27, 2007

(51) Int. Cl.
  *G06F 17/50* (2006.01)
  *H04L 12/00* (2006.01)
(52) U.S. Cl. .............. 703/2; 703/22; 717/124; 718/104; 370/395.21
(58) Field of Classification Search .......... 703/2, 703/22; 717/124; 370/395.21, 395; 718/104
See application file for complete search history.

(56) References Cited

U.S. PATENT DOCUMENTS

| | | | |
|---|---|---|---|
| 7,548,879 B2 * | 6/2009 | Cash et al. ............. | 705/35 |
| 2004/0015424 A1 * | 1/2004 | Cash et al. ............. | 705/35 |
| 2004/0136379 A1 * | 7/2004 | Liao et al. ............. | 370/395.21 |
| 2006/0248510 A1 * | 11/2006 | Dournov et al. ......... | 717/124 |

OTHER PUBLICATIONS

S.Keshav "A Control-Theoretic Approach to Flow Control" (Originally Published in: Proc. SIGCOMM '91, vol. 24, No. 1 Aug. 1991).

\* cited by examiner

*Primary Examiner*—Thai Phan

(57) ABSTRACT

A system framework for supporting system performance prediction that includes a system having a plurality of external interactors interfacing thereto, each external operator operates to service a plurality of items for input to the system, the system operates to determine arrival rates of the plurality of items arriving at the plurality of external interactors and to calculate a service time that each of the plurality of external interactors takes to service those items it receives; and a queue modeling module that operates to select a queuing model based on the received arrival times and the calculated service times and to calculate a queue length of items at each of the external interactors.

20 Claims, 3 Drawing Sheets

SYSTEM AND METHOD FOR SUPPORTING PERFORMANCE PREDICTION OF A SYSTEM HAVING AT LEAST ONE EXTERNAL INTERACTOR

BACKGROUND

An enterprise resource planning (ERP) system is a computerized system that enables an enterprise to integrated all data and processes of the enterprise into a unified system. The enterprise may be a for-profit organization or business such as a company or corporation, or a non-profit organization such as a non-profit company or a governmental entity. Enterprises often rely heavily on the function and performance of their ERP systems for management purposes, such as keeping track of large amounts of items flowing through the enterprises. These items may be physical items (physical component parts and finished products, parcels, boxes, warehouse merchandises, etc.) or abstract items (installed software, consulting services rendered, etc.). For example, if an ERP system runs too slow, the enterprise cannot ship products to customers as rapidly as desired, leading to loss of profits, unhappy customers, etc. Often times, an ERP system must interact with the "real world" in order to obtain information on the locations of items and to provide instructions about what to do with such items. These interactions typically involve agents external to the ERP system. Such agents could be humans such as loading-dock employees with bar-code scanners or machineries such as robots or other automated systems.

Because of its complexity and centrality to an enterprise, an ERP system is typically tested fairly carefully before it is placed into full deployment in the enterprise. Most of the fully computerized aspects of the ERP system may be tested at a software-simulated full-scale load so as to ensure that the ERP system will perform adequately under a real computing or computer-processing workload. However, it is difficult to fully test the entire ERP system, specifically including external interactors, such as external agents noted above, under full load prior to a full deployment. That is because such a full test may require time- and cost-consuming observations of a large number of external interactors in order to obtain the service times of the external interactors. Without such actual observations, it may be difficult to know the per-item service time, especially if: (1) the item varies according to parameters of the item, such as the weight and size for a physical parcel or the size of a software application to be installed; (2) the process of observing the item may influence or perturb its service time—for example, a human worker might work unusually rapidly if another person is standing there with a stopwatch; and (3) it is simply too expensive to employ enough observers to get an accurate set of measurements of the service time, or any combination thereof.

Consequently, for practical reasons, it is often necessary to test the ERP system under a relatively light load with observations for a sampling or subset of all of its external interactors and to then extrapolate the results to predict the system performance under full load. However, it is difficult to make such a prediction with accuracy because the extrapolation of system performance for a light load may not expose the ERP system to queuing delays that only happen or appear under heavier loads. Thus, at times, an ERP system that appears to perform sufficiently well in pre-deployment testing ends does not perform well enough in full deployment. That is, as a queue of items flowing through an enterprise builds up, the delay to the processing of such items by an external interactor changes from being governed by the interactor's service time (how long it takes the interactor to handle one item, with no queuing) to be governed by queuing delays. For example, if it normally takes one minute for a loading-dock worker to process a parcel, but there is currently a queue of 100 parcels for the worker to process, the total delay for processing the next parcel added to the queue will be about 100 minutes.

Accordingly, it is beneficial to take into account conditions at external interactors of an ERP system so as to more accurately test and predict the performance of such an ERP system when it is deployed under full load.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
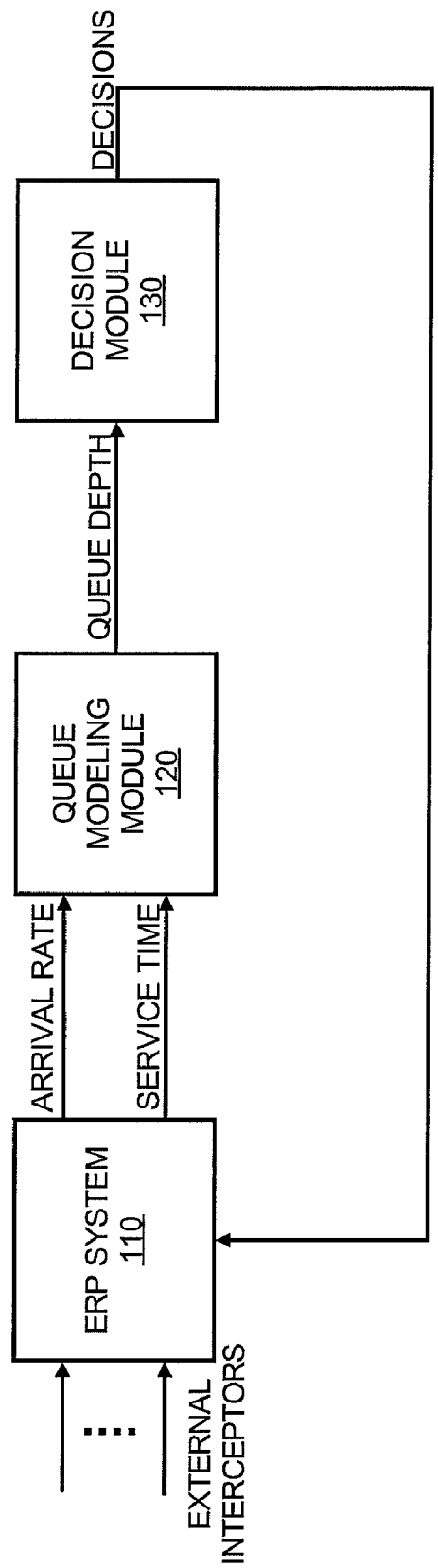
FIG. 1 illustrates a block diagram of a system framework for testing and predicting performance of a system that has external interactors, in accordance with one embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are systems and methods for supporting the testing and performance prediction of a system having external interactors, wherein the system testing and performance prediction are parameterized by real-world attributes, including service time and queuing depth or length at the external interactors, so as to more accurately the system performance under full load in deployment. In one example, the systems of interest for testing and performance prediction include those enterprise resource planning (ERP) systems that have external interactors, such as traditional ERP systems in the manufacturing, supply chain, and warehouse management environments, that involve external interactors and their service times. However, the systems and methods as described herein are applicable for any system having one or more external interactors.

As referred herein, an external interactor of a system, such as an ERP system, is an entity in the real world that is external to or outside of the computing or processing realm of the system but performs an external service (e.g., an action) on an item as it arrives at the system to enable the flow of such an item through the system. Thus, as referred herein, a service time is the time it takes (with no queuing) for the external entity to service the item, and an arrive rate is the rate at which items arrive at the system for servicing by the external interactor. The external interactor may be a human or any other living mechanism, or a robot or any other automated system. For example, in an ERP system for managing a warehouse, an external interactor may be a loading-dock employee with a bar-code scanner, the service time is the time it takes for the employee to the action of bar-code scanning an item, and the arrival rate is the rate at which items arrive for bar-code scanning. In another example, for an ERP system in an auto manufacturing environment, an external interactor may be a robot on the assembly line that is tasked with welding designated auto parts together, the service time in is the time it takes for the robot to perform a welding of the designated auto parts, and the arrival rate is the rate at which the designated auto parts arrive at the robot for welding. In yet another example, for an ERP system in an insurance claim processing environment, an external interactor may be a human insurance claims expert tasked with evaluating insurance claims, the service time is the time it takes for the claims expert to finish processing a claim, and the arrival rate is the rate at which a workflow system provides unprocessed claims to the expert.

System

FIG. 1 illustrates a block diagram of a system framework 100 for testing and predicting performance of a system that has external interactors, wherein such system testing and performance prediction are parameterized by attributes of the external interactors. The system framework 100 includes a system to be tested, such as an ERP system 110, a queue modeling module 120, and a decision module 130. To test and predict the performance of the ERP system 110, the queue modeling module 120 obtains an arrival rate of items at the ERP system 110 for servicing by each of the external interactors and a service time for the items, wherein the arrival rate serves as a proxy for predicting the system performance under full load without having to observe such a full load during a pre-deployment system testing. The arrival rate of items at the ERP system 110 may be predefined and provided to the ERP system 110 and forwarded to the queue modeling module 120 (e.g., based on contractual obligations to deliver a certain number of parcels to the warehouse at designated times or some other approaches for obtaining or predicting the arrival rate). Alternatively, during pre-deployment testing wherein the ERP system runs with a limited number of external interactors and test items for a predefined period of time, the ERP system 110 is operable to log in the times at which items are delivered for servicing by an external interactor and input into the ERP system 110. The ERP system 110 then calculates the arrival rate, which may be a probability distribution of the logged times, and provide such information to the queue modeling module 120. The service time for the items may be measured in the ERP system 110 as described below.

In one embodiment, during pre-deployment testing, it is possible to measure the service time of an item by an external interactor without having direct observation of the external interactor by applying techniques similar to those employed in the IT field for packet networking. Thus, time and cost associated with direct observations may be minimized. In many IT networking cases, networking endpoints (analogous to the ERP system 110) must infer packet queue lengths in network routers (analogous to queue lengths of items at the external interactors) without being able to observe these queues directly. Network researchers have developed a number of techniques to make this inference, which can all be viewed as variants of Keshav's "packet-pair" approach, S. Keshav, *A control-theoretic approach to flow control*, Proc. SIGCOMM'91, Vol. 24, No. 1, August 1991. In this approach, two data packets, such as IP (Internet protocol) packets, are transmitted back-to-back (i.e., with the minimal possible separation), and their time separation is observed at the receiver. The time separation then represents the amount of queuing or delay along the way.

Accordingly, it is possible to apply a packet-pair-like approach in the ERP system 110 during pre-deployment testing so as to measure the service time it takes an external interactor to service one item by logging the times for each completed servicing of an item by the external interactor and, in one example, inferring the minimal time separation between servicing of successive items (i.e., the minimal time measured for a completely servicing) as the average or mean service time in a normal or Gaussian distribution with a predetermined minimal standard deviation. In another example, the service time may be represented by a probability distribution of the logged servicing times. Examples of a probability distribution include but are not limited to a normal distribution, a hyperbolic distribution, an exponential distribution, and a gamma distribution. The type of probability distribution may be chosen as desired by the user or operator that is testing the ERP system 110 and may be based on the logged service times as well.

The service time for an item may depend on the parameters or metrics of the item (e.g., size or weight of a box being loaded and bar-scanned into a warehouse) and the parameters or metrics of the environment in which the item is being serviced (e.g., time of day, time of week). Because an ERP system typically has knowledge of item metrics, the items may be divided into groups or buckets so as to derive approximate correlations between these metrics and the service time. That is, the ERP system 110 is operable to log the times for servicing each group of items and to infer the minimal time separation between item servicing as the average or mean service time for each group of items. Alternatively, as mentioned above, the service time for each group of items may be represented by a probability distribution. Consequently, the service time may be measured at a finer resolution. In this case, the mean service times or the service-time probability distributions for all the groups of items being serviced by the same external interactor may be further modeled as an overall probability distribution of the service time of the external interactor for all items. Alternatively, the service-time probability distributions is used for a separate performance prediction of the ERP system 100 for each divided group of items. Thus, accuracy of the inference-based approach to measuring the service time depends on the availability of fairly complete event logs with precise or fine-grained timing information in the ERP system 110. Such accuracy also depends on accurate timing and synchronization between computing or processing machines (e.g., computers) if the ERP system 110 is distributed across multiple machines.

Once the arrival rate and service time are known, the queue modeling module 120 is operable to apply an appropriate queuing theory with such information to compute the queue depth or length of items flowing through the ERP system 110 under full load. The computed queue depth or length is then provided to a decision module 130 for performance prediction based on any known prediction methods, wherein decisions may be made based on predetermined policies applied in the decision module 130. The decisions may be fed back to the ERP system 110 to adjust the parameters in the ERP system 110 and those of the external interactors to the ERP system 110 in order to improve the system performance.

Figure 2:
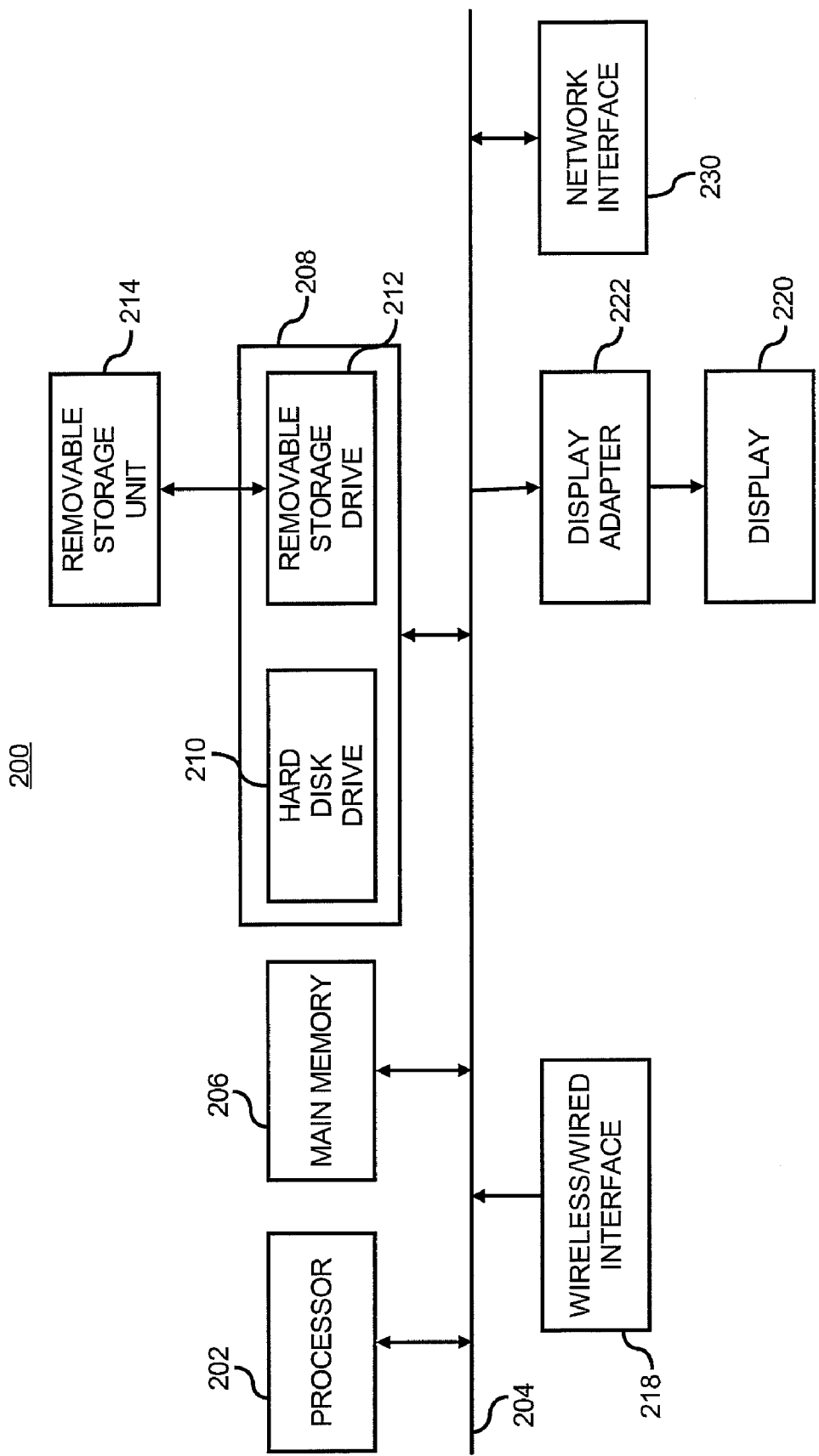
FIG. 2 illustrates a block diagram of a computerized system wherein one or more system components in the system framework of Claim 1 may be practiced, in accordance with one embodiment.

FIG. 2 illustrates a block diagram of a computerized system 200 that is operable to be used as a platform for implementing the queuing model 120, the decision model 130, or both. The computerized system 200 also may be employed as a platform within the ERP system 110 to calculate or obtain the arrival rate and service time of items serviced by external interactors of the ERP system 110. The computerized system 200 includes one or more processors, such as processor 202, providing an execution platform for executing software. Thus, the computerized system 200 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 202 are communicated over a communication bus 204 or through point-to-point links with other components in the computer system 200.

The computer system 200 also includes a main memory 206 where software is resident during runtime, and a secondary memory 208. The secondary memory 208 may also be a computer-readable medium (CRM) that may be used to store software programs, applications, or modules to implement the queuing modeling in the module 120, the decision making process in the module 130, or both. The main memory 206 and secondary memory 208 (and an optional removable storage unit 214) each includes, for example, a hard disk drive and/or a removable storage drive 212 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 200 includes a display 220 connected via a display adapter 222, user interfaces comprising one or more input devices 218, such as a keyboard, a mouse, a stylus, and the like. However, the input devices 218 and the display 220 are optional. A network interface 230 is provided for communicating with other computer systems via, for example, a network.

Method

Figure 3:
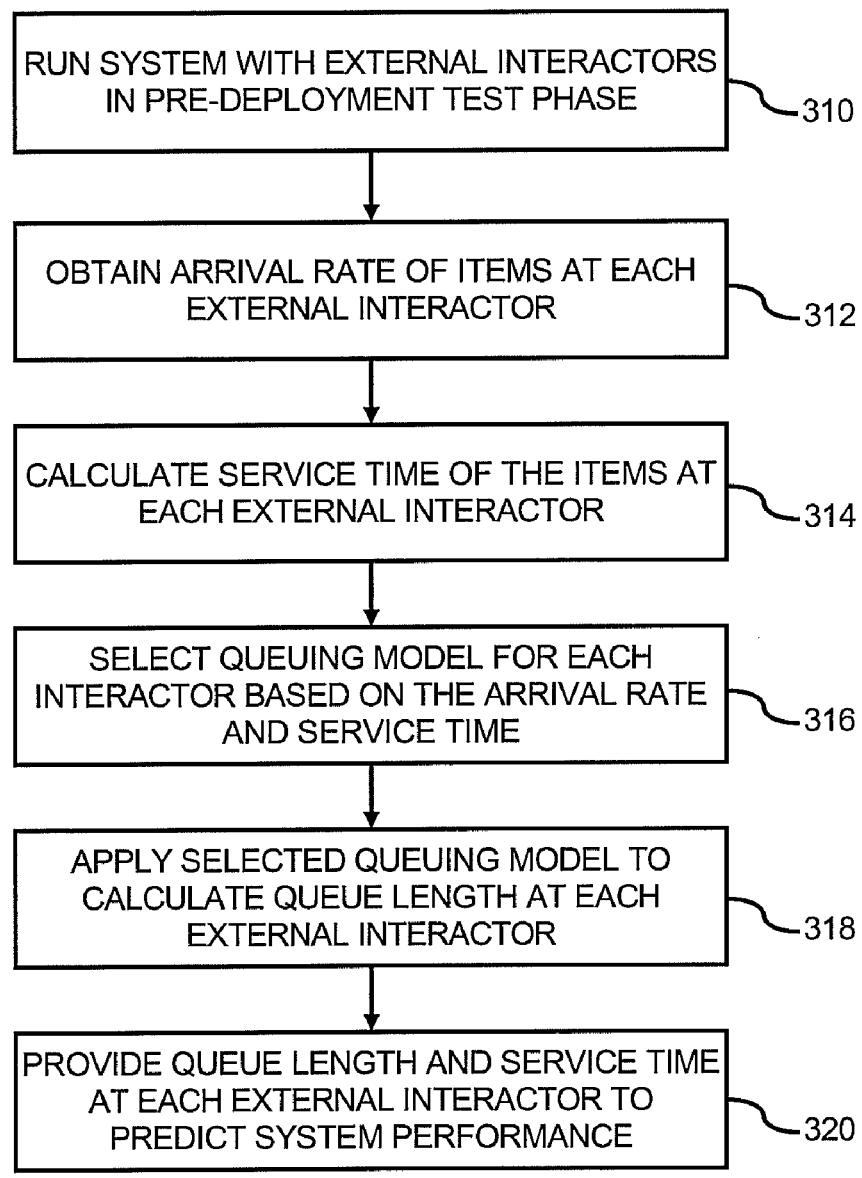
FIG. 3 illustrates a method for supporting performance prediction of a system having external interactors by deriving a service time and queue lengths at the external interactors, in accordance with one embodiment.

FIG. 3 illustrates method 300 for supporting performance prediction of a system having external interactors, such as the ERP system 110 in FIG. 1, in a pre-deployment test phase by deriving a service time and queue lengths at the external interactors, which are found to affect to the system performance, in accordance with one embodiment. For illustrative purposes and not to be limiting thereof, FIG. 3 is described in the context of the system framework 100. Also, for descriptive purposes, an example is provided wherein the ERP system 110 is one for warehouse management that involves the use of a human operator as an external interactor at the warehouse loading dock to receive and bar-code scan boxes of supplies for warehouse storage as they arrive at the warehouse, wherein the bar-code scanned information is transmitted to, or otherwise received by, a computer or electronic database of the ERP system 110 in a manner known in the art. However, it should be understood that the method 300 is applicable in a similar manner to any system having one or more external interactors, wherein the method 300 is applied for each of the external interactors. Thus, any performance prediction for the ERP system 110 would include the consideration of multiple queue lengths calculated for the multiple external interactors.

At 310, the ERP system 110 is run under test in a pre-deployment phase with a predefined number of external interactors and a predefined number of items to be serviced by the external interactors for a predefined test period. The predefined number of external interactors may be less than the total number of external interactors that may be used when the ERP system 110 is in deployment under full load. Likewise, the predefined number of test items to be serviced may be less than the total number of items to be serviced when the ERP system 110 is in deployment under full load. For example, a limited number of human operators are employed to receive and bar-code scan a limited number of boxes of supplies as they arrive at the warehouse for storage, wherein both the number of human operators and boxes used in this pre-deployment testing phase are substantially less than their respective numbers anticipated when the ERP system 110 is in operation under full load.

At 312, an arrival rate of items arriving at each external interactor is received by the queue modeling module 120, wherein the arrival rate represents the estimated arrival rate of items at each external interactor that corresponds with the test external interactor during full deployment of the ERP system 110. As noted earlier, the arrival rate may be predefined and provided by the ERP system 110 to the queue modeling module 120 based on some known approaches for obtaining or predicting such an arrival rate. The arrival rate may be in the form of a probability distribution.

At 314, a service time it takes for each external interactor to service one of the items is calculated by either the ERP system 110 and provided to the queue modeling module 120, or calculated by the queue modeling module 120 based on information obtained from the ERP system 110. For example, the time it takes for each human operator to load and bar-code scan a box into the warehouse is observed based on the bar-code scanning information that is received by the ERP system 100. As discussed earlier, the service time may be calculated as the observed minimal time separation between successive item servicing or a probability distribution of all logged time separations. Optionally, as also discussed earlier, the items may be divided in groups of items that have similar item metrics or parameters, similar servicing environments, or both. Then, a service time for each group is calculated as the observed minimal time separation or a probability distribution of all logged time separations. Consequently, the service time of the external interactor for servicing each of the items in the pre-deployment testing phase (or each group of items in such a testing phase) is calculated.

At 316, once the arrival rate and service time are available, the queue modeling module 120 selects an appropriate queuing model given the probability distributions of the arrival rate and the service time. For example, if the probability distributions of both the arrival rate and service time are exponential distributions, the queuing model used is a M/M/1 queuing model, wherein the first M represents the exponential interarrival time distribution, as presented by the arrival time distribution, and the second M represents the exponential service time distribution. In another example, if the arrival rate is of an exponential distribution, and the service time is of a general distribution (such as a Gaussian distribution) other than an exponential distribution, the queuing model used in a M/G/1 queuing model, wherein the first M represents the exponential interarrival time distribution, as presented by the arrival time distribution, and the second M represents the general service time distribution.

At 318, the queue modeling module 120 proceeds to calculate a queue length or depth of the ERP system 110 at each particular external interactor, using the selected queuing model with the arrival rate and service time as inputs, in a manner understood in the art for queuing-theory computations. Optionally, if service times are provided for multiple groups of items as calculate at 314, the queue modeling module 120 is operable to calculate a separate queue length for each group of items.

At 320, the queue modeling module 120 provides the calculated queue length(s) and service time to the decision module 130, which then predicts the performance of the ERP system 110 under full load based on any known prediction methods that take into consideration the service time and queue lengths that are exhibited at the external interactors. Optionally, the decision module 130 may include predetermined policies that may be applied to provide one or more decisions back to the ERP system 110 for adjustment of ERP system 110, its external interactors, or both to improve system performance.

In recap, the systems and methods as described herein support more accurate performance prediction of a system having external interactors by taking into account the service times and queue lengths that are exhibited at the external interactors.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for supporting performance prediction of a system having at least one external interactor, comprising:
    running the system under test in a pre-deployment phase with a predefined number of items to be serviced by the at least one external interactor for input into the system;
    receiving an arrival rate of items arriving at the at least one external interactor for servicing and input to the system, wherein the arrival rate represents an arrival rate of items for the system during operation under full load in a deployment phase;
    calculating a service time that the at least one external operator takes to service one of the predefined number of items;
    selecting a queuing model based on the received arrival time and the calculated service time;
    applying the selected queuing model to calculate a queue length of items for servicing at the at least external interactor based on the received arrival time and the calculated service time; and
    providing the calculated queue length and the calculated service time for performance prediction of the system.

2. The method of claim 1, wherein the system is an enterprise resource planning (ERP) system.

3. The method of claim 2, wherein the ERP system in an ERP system in one of a manufacturing, supply chain, and warehouse management environment.

4. The method of claim 1, wherein the predefined number of items to be serviced by the at least one external interactor is less a number of items to be serviced and input to the system in a deployment phase under full load.

5. The method of claim 1, wherein calculating the service time comprises:
    measuring time separations between successive items serviced by the external interactor for all of the predefined number of items; and
    selecting a minimal time separation from the measured time separations as an average of the service time.

6. The method of claim 1, wherein calculating the service time further comprises:
    generating a normal distribution for the calculated minimal time separation with the average service time as a mean service time and a predefined standard deviation for the mean service time.

7. The method of claim 1, wherein calculating the service time comprises:
    measuring time separations between successive items serviced by the external interactor for all of the predefined number of items;
    generating a probability distribution of the service time based on the measured time separations.

8. The method of claim 1, wherein calculating the service time comprises:
    dividing the predefined number of items into groups of items having similar metrics;
    measuring time separations between successive items serviced by the external interactor for each of the groups of items; and
    selecting a minimal time separation from the measured time separations in each of the groups of items as an average of the service time for each of the group of items.

9. The method of claim 1, wherein calculating the service time comprises:
    dividing the predefined number of items into groups of items having similar metrics;
    measuring time separations between successive items serviced by the external interactor for each of the groups of items; and
    generating a probability distribution of the service time for each of the groups of items based on the measured time separations for each of the groups of items.

10. The method of claim 9, wherein:
    the step of selecting the queuing model includes selecting a corresponding queuing model for each of the groups of items based on the received arrival time and the probability distribution of the service time for each of the groups of items;
    the step of applying the selected queuing model includes applying the selected corresponding queuing model to calculate a corresponding queue length of items for servicing at the at least external interactor based on the received arrival time and the probability distribution of the service time for each of the groups of items; and
    the step of providing the calculated queue length includes providing the corresponding queue length and the probability distribution of the service time for performance prediction of the system for each of the groups of items.

11. A system framework for supporting system performance prediction comprising:
    a system having a plurality of external interactors interfacing thereto, each external operator operates to service a plurality of items for input to the system, the system operates to determine arrival rates of the plurality of items arriving at the plurality of external interactors and to calculate a service time that each of the plurality of external interactors takes to service those items it receives; and
    a queue modeling module that operates to select a queuing model based on the received arrival times and the calculated service times and to calculate a queue length of items at each of the external interactors.

12. The system framework of claim 11, wherein the system comprises an enterprise resource planning (ERP) system.

13. The system framework of claim 11, wherein the ERP system in an ERP system in one of a manufacturing, supply chain, and warehouse management environment.

14. The system of claim 11, further comprising:
a decision module that receives the calculated service times and the calculated queue lengths to predict a performance of the system.

15. The system of claim 11, wherein the calculated service times at the plurality of external interactors are represented as probability distributions, and the queuing model selected for calculating the queue length at one of the external interactors is based at least on a type of probability distribution of the calculated service time at the one external interactor.

16. The system of claim 15, wherein the arrival times at the plurality of external interactors are represented as probability distributions, and the queuing model selected for calculating the queue length at one of the external interactors is further based on a type of probability distribution of the arrival time at the one external interactor.

17. A computer-readable medium on which is embedded computer-executable programming code that is executed by a computer processor to:
run a system having at least external interactors under test in a pre-deployment phase with a predefined number of items to be serviced by the at least one external interactor for input into the system;
receive an arrival rate of items arriving at the at least one external interactor for servicing and input to the system, wherein the arrival rate represents an arrival rate of items for the system during operation under full load in a deployment phase;
calculate a service time that the at least one external operator takes to service one of the predefined number of items;
select a queuing model based on the received arrival time and the calculated service time;
apply the selected queuing model to calculate a queue length of items for servicing at the at least external interactor based on the received arrival time and the calculated service time; and
provide the calculated queue length and the calculated service time for performance prediction of the system.

18. The computer-readable medium of claim 17, wherein the system is an enterprise resource planning (ERP) system.

19. The computer-readable medium of claim 18, wherein the ERP system in an ERP system in one of a manufacturing, supply chain, and warehouse management environment.

20. The method of claim 17, wherein the predefined number of items to be serviced by the at least one external interactor is less a number of items to be serviced and input to the system in a deployment phase under full load.

* * * * *